(12) United States Patent
Gumiero et al.

(10) Patent No.: US 12,465,264 B2
(45) Date of Patent: Nov. 11, 2025

(54) WEARABLE BIOMEDICAL DEVICE FOR ACQUIRING PHYSIOLOGICAL PARAMETERS OF A PATIENT, WITH SAFETY MECHANISM

(71) Applicant: STMICROELECTRONICS S.r.l., Agrate Brianza (IT)

(72) Inventors: Alessandro Gumiero, Milan (IT); Luigi Della Torre, Lissone (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 405 days.

(21) Appl. No.: 18/146,259

(22) Filed: Dec. 23, 2022

(65) Prior Publication Data
US 2023/0210435 A1    Jul. 6, 2023

(30) Foreign Application Priority Data
Jan. 3, 2022    (IT) ........................ 102022000000035

(51) Int. Cl.
*A61B 5/332*      (2021.01)
*A61B 5/00*      (2006.01)
(Continued)

(52) U.S. Cl.
CPC ............ *A61B 5/332* (2021.01); *A61B 5/0006* (2013.01); *A61B 5/256* (2021.01); *A61B 5/282* (2021.01);
(Continued)

(58) Field of Classification Search
None
See application file for complete search history.

(56) References Cited

U.S. PATENT DOCUMENTS

| | | | |
|---|---|---|---|
| 7,346,391 B1 * | 3/2008 | Osorio | A61B 5/6864 607/139 |
| 9,277,864 B2 | 3/2016 | Yang et al. | |

(Continued)

OTHER PUBLICATIONS

"Smart Wearable ECG EKG Monitor-QardioCore-Qardio," URL=https://www.qardio.com/qardiocore-wearable-ecg-ekg-monitor-iphone/, download date Dec. 16, 2022. (13 pages).

(Continued)

*Primary Examiner* — Kennedy Schaetzle
(74) *Attorney, Agent, or Firm* — Seed IP Law Group LLP

(57) ABSTRACT

The present disclosure is directed to a solid body for a biomedical device, wearable by a patient and configured to acquire one or more physiological parameters of the patient. The solid body includes a first rigid portion, a second rigid portion and a connection portion of flexible type which couples the first and the second rigid portions to each other; and a control circuitry accommodated inside the first and/or the second rigid portions. The connection portion is interposed between the first and the second rigid portions, is integral therewith and is deformable so as to allow a relative movement of the first and the second rigid portions. The first and the second rigid portions are physically couplable to a first and to a second ECG electrode to couple the solid body to the torso of the patient. When the rigid portions are coupled to the ECG electrodes, the control circuitry is electrically coupled to the ECG electrodes and is configured to acquire, through the ECG electrodes, respective electrical signals indicative of said one or more physiological parameters.

20 Claims, 6 Drawing Sheets

(51) Int. Cl.
    *A61B 5/256*       (2021.01)
    *A61B 5/282*       (2021.01)

(52) U.S. Cl.
    CPC .... *A61B 5/6823* (2013.01); *A61B 2560/0412* (2013.01)

(56) References Cited

U.S. PATENT DOCUMENTS

| | | | |
|---|---|---|---|
| 2011/0241828 A1* | 10/2011 | Wang | B65D 41/04 340/5.53 |
| 2014/0275932 A1 | 9/2014 | Zadig | |
| 2015/0045628 A1 | 2/2015 | Moghadam et al. | |
| 2015/0087948 A1* | 3/2015 | Bishay | A61B 5/6833 600/382 |
| 2015/0272466 A1 | 10/2015 | Laakkonen et al. | |
| 2018/0184194 A1* | 6/2018 | Ohlander | H04R 1/1008 |
| 2020/0169848 A1* | 5/2020 | Daoura | H04W 4/80 |
| 2020/0221968 A1 | 7/2020 | Gumiero et al. | |

OTHER PUBLICATIONS

"The myPatch®s| Monitoring Specialists, DMS Service," URL= http://dms-service.com/, download date Dec. 16, 2022. (6 pages).
"HealthPatchMD," URL=web.archive.org/web/20150530030833/ http://www.vitalconnect.com/healthpatch-md, May 30, 2015. (2 pages).

\* cited by examiner

WEARABLE BIOMEDICAL DEVICE FOR ACQUIRING PHYSIOLOGICAL PARAMETERS OF A PATIENT, WITH SAFETY MECHANISM

BACKGROUND

Technical Field

The present disclosure relates to a solid body of a biomedical device for acquiring physiological parameters of a patient, and to a related biomedical device.

Description of the Related Art

As known, the monitoring of physiological parameters indicative of the health of a patient, such as parameters related to cardiac or respiratory activity, may currently be performed both in healthcare facilities by suitably trained medical personnel and outside healthcare facilities (e.g., at the patient's home). The possibility of monitoring these parameters anywhere allows a continuous and more accurate control of the health state of the patient.

Various solutions allow the monitoring of these physiological parameters of the patient even outside healthcare facilities, in particular for sensing cardiac activity. For example, there are devices (an example is shown in FIG. 1 with reference number 1) wearable by the patient which allow the continuous monitoring of these parameters and the storage and/or transmission of the latter to the medical personnel. Generally, the device 1 comprises a main body 3, that is reusable, including the sensors to perform the desired measurements and couplable to the body of the patient through a disposable patch 5 which includes a sensitive element for measuring electrical quantities indicative of physiological parameters.

However, these solutions have various disadvantages.

For example, both the main body 3 and the patch 5 are voluminous and bulky and cause discomfort in the patient wearing them, limiting his/her freedom of movement and causing undesired effects such as reddening, itching and rashes in the zones of the body of the patient in contact with the patch 5.

Furthermore, in order to reduce the patient's discomfort in wearing these devices 1 the devices are attached to the body of the patient in a very accurate manner; however, in order to reduce the intervention of medical personnel and therefore the patient's visits to healthcare facilities, these devices 1 are often attached to the body of the patient by the same patient or by family members, and therefore by people who do not have a detailed knowledge of medical procedures or of the operation of the same devices. As a result, these devices 1 may be worn incorrectly (e.g., incorrect coupling of the electrodes present in the patch with the main body), causing discomfort in the patient and putting the correctness and accuracy of physiological parameter sensing at risk.

The device 1 is not impermeable and therefore their operation is affected by the presence of water or humidity (e.g., the patient's sweat). For example, the device is removed from the body of the patient before each shower. Often the main body 3 has to be sterilized periodically in order to prevent risks for the health of the patient, but due to the lack of impermeability this disinfection cannot be done in an easy manner (e.g., by completely immersing the main body 3 in water or disinfectant solution).

Furthermore, the patch 5 used to attach the main body of the device to the skin of the patient is customized for the specific application and for the specific device 1, and this lack of standardization increases the total cost of using the device 1 and the complexity of finding the parts for using the same.

Finally, the device 1 has various problems depending on the type of energy reserve chosen. In particular, devices which comprise a battery that is rechargeable and internal to the main body: the main body has electrical connection holes to allow recharging the battery (which is not extracted from the main body during recharging). However, this prevents the main body from being impermeable (or in any case greatly complicates its structure and increases its overall cost) and utilizes an external charger (shown in FIG. 2 with reference number 7) having the main body 3 couplable thereto to perform recharging. Otherwise, devices comprising a non-rechargeable battery of throwaway type, also customized for the specific application and not standardized. Due to the desire to periodically replace the battery, these devices have a higher use cost and have more difficult maintenance, not compatible with use by elderly or disabled patients.

BRIEF SUMMARY

Various embodiments of the present disclosure provide a solid body for a biomedical device for acquiring physiological parameters of a patient, and a related biomedical device, which overcome the drawbacks of the prior art.

The solid body includes a first rigid portion, a second rigid portion and a connection portion of flexible type which couples the first and the second rigid portions to each other; and a control circuitry accommodated inside the first and/or the second rigid portions. The connection portion is interposed between the first and the second rigid portions, is integral therewith and is deformable so as to allow a relative movement of the first and the second rigid portions. The first and the second rigid portions are physically couplable to a first and to a second ECG electrode to couple the solid body to the torso of the patient. When the rigid portions are coupled to the ECG electrodes, the control circuitry is electrically coupled to the ECG electrodes and is configured to acquire, through the ECG electrodes, respective electrical signals indicative of said one or more physiological parameters.

BRIEF DESCRIPTION OF THE SEVERAL VIEWS OF THE DRAWINGS

For a better understanding of the present disclosure, embodiments are now described, purely by way of non-limiting example, with reference to the attached drawings, wherein.

DETAILED DESCRIPTION

Elements common to the different embodiments of the present disclosure, described hereinafter, are indicated with the same reference numbers.

Figure 1:
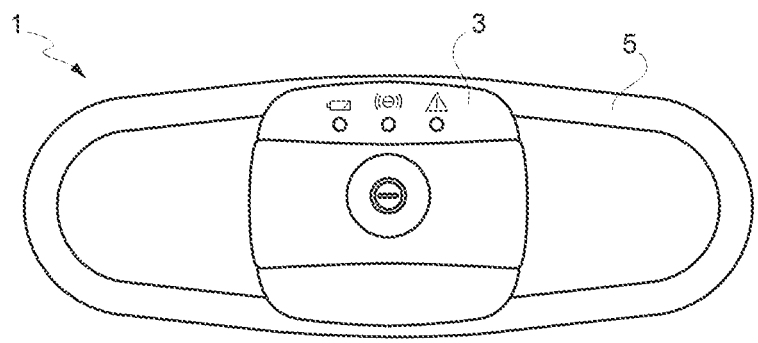
FIG. 1 is a top view of a device of a known type for measuring the physiological parameters of a patient.
Figure 2:
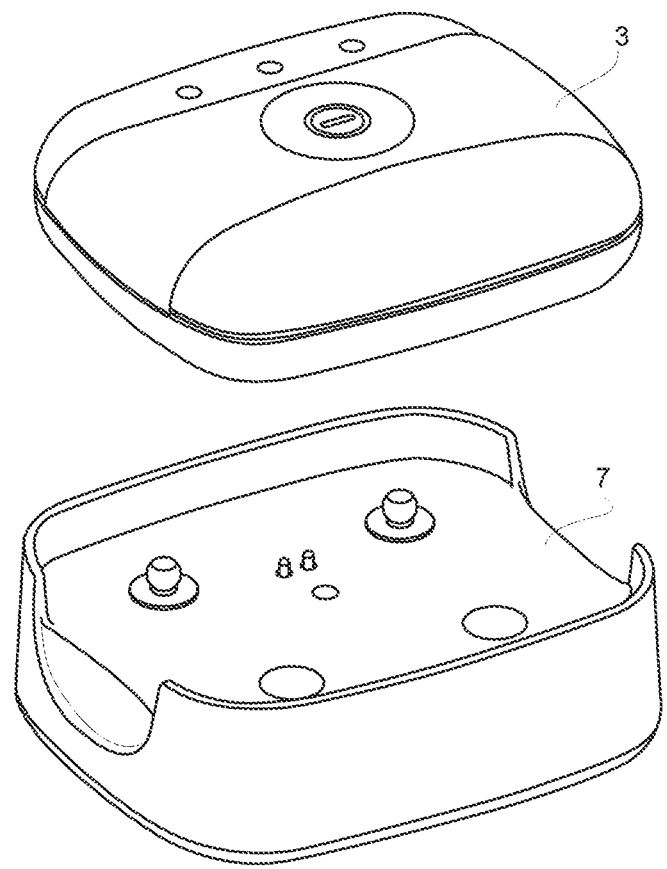
FIG. 2 is a perspective view of a main body of the device of FIG. 1 and of an external charger for recharging the device.
Figure 3A:
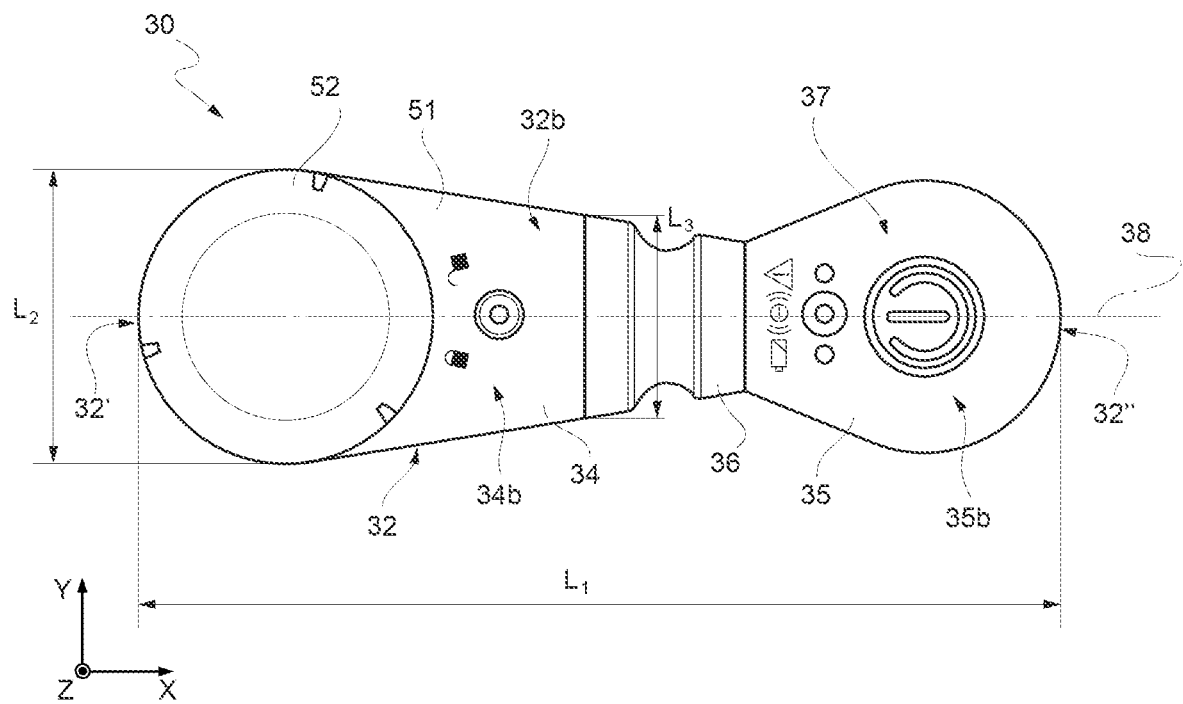
FIG. 3A is a top view of a main body of a biomedical device for measuring one or more physiological parameters, according to an embodiment and in a rest condition of the main body.
Figure 3B:
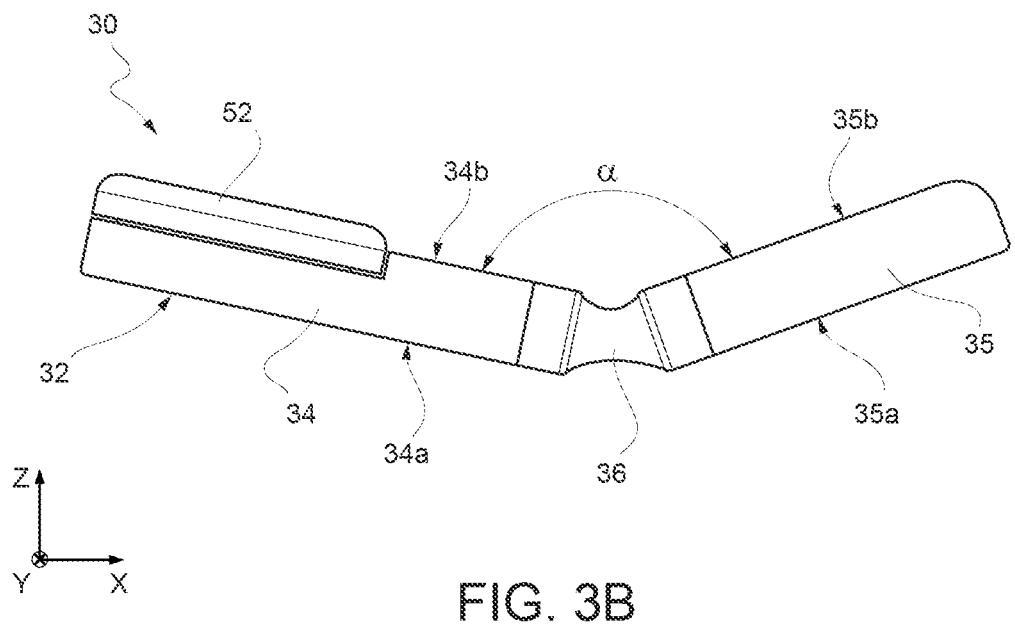
FIG. 3B is a side view of the main body of the biomedical device of FIG. 3A in a deformed condition of the same.
Figure 4:
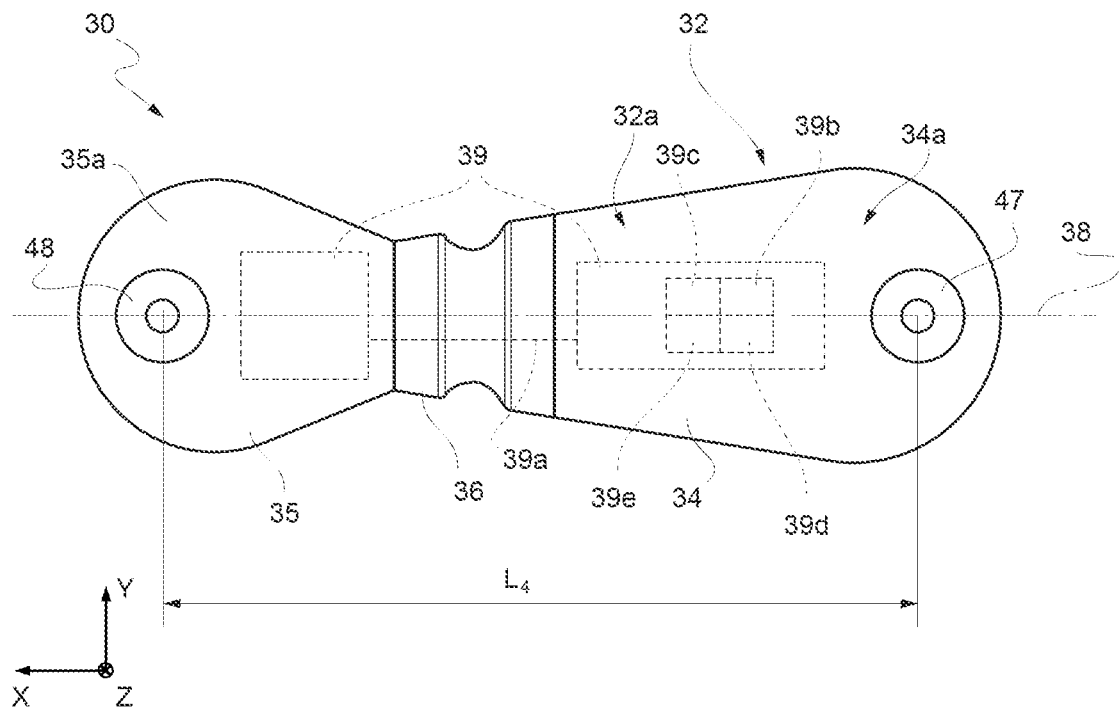
FIG. 4 is a bottom view of the main body of the biomedical device of FIG. 3A.

FIG. 3A shows, in a triaxial Cartesian reference system defined by axes X, Y and Z, a main body (or solid body) 32 of a biomedical device 30 wearable by a patient and configured to measure one or more physiological parameters (or vital parameters) of the patient. For example, the one or more physiological parameters are one or more parameters of the following: electrocardiogram (ECG), heart rate, respiratory rate, measurement of motor activity index, posture recognition (e.g., patient standing or lying down), measurement of the heartbeat. FIG. 3B is a side view of the main body 32 of the biomedical device 30 in a deformed condition of the same. FIG. 4 is a bottom view of the main body 32 of the biomedical device 30.

The main body 32 is a housing that has a first surface (shown in FIG. 4 with reference 32$a$) which, in use, faces the skin of the patient, and a second surface (shown in FIG. 3A with reference 32$b$) opposite to the first surface 32$a$.

The main body 32 comprises a first rigid portion 34 and a second rigid portion 35 joined to each other by a connection portion 36 of flexible (and non-filiform) type which is interposed between the first and the second rigid portions 34, 35. The connection portion 36 is integral with the first and the second rigid portions 34 and 35.

In detail, each rigid portion 34, 35 has a first surface 34$a$, 35$a$ and a second surface 34$b$, 35$b$ opposite to each other along the axis Z, the first surface 34$a$, 35$a$ being configured to face the skin of the patient. The first surfaces 34$a$ and 35$a$ of the rigid portions 34, 35 are part of the first surface 32$a$ of the main body 32, and the second surfaces 34$b$ and 35$b$ of the rigid portions 34, 35 are part of the second surface 32$b$ of the main body 32.

In a rest condition of the main body 32 wherein no forces are applied to the main body 32 (shown in FIG. 3A), the rigid portions 34 and 35 and the connection portion 36 are aligned with each other along an alignment axis 38, and the main body 32 has a main extension along this alignment axis 38. Stated differently, the rigid portions 34 and 35 and the connection portion 36 are coplanar. For purely illustrative and non-limiting purposes, the alignment axis 38 is here parallel to the axis X and the first and the second surfaces 32$a$ and 32$b$ are substantially planar and parallel to an XY plane defined by the axes X and Y.

The rigid portions 34 and 35 are rigid and non-deformable, while the connection portion 36 is flexible and elastically deformable orthogonally to the alignment axis 38. In particular, the deformation of the connection portion 36 does not generate substantial elongations or contractions of the connection portion 36 along the alignment axis 38 (e.g., any elongations or contractions are less than about 5% of the rest length of the connection portion 36, measured along the alignment axis 38) but instead allows a relative movement of the first and the second rigid portions 34, 35 and therefore a bending of the main body 32 at the connection portion 36. In other words, the main body 32 may pass from the rest condition (FIG. 3A, wherein the rigid portions 34 and 35 are aligned with each other along the alignment axis 38) to a deformed condition (FIG. 3B, wherein the rigid portions 34 and 35 are misaligned with each other along the alignment axis 38), and vice versa. For example, in the deformed condition of the main body 32, the rigid portions 34 and 35 define a bending angle α to each other that is different from 180° (for example defined between the second surfaces 34$b$ and 35$b$ of the rigid portions 34 and 35). The bending angle α, for example, is 180° in the rest condition and less than 180° in the deformed condition.

In the exemplarily considered embodiment in FIG. 3A, the first and the second rigid portions 34 and 35 have a tapered shape along the alignment axis 38, at the connection portion 36. In other words, the first and the second rigid portions 34 and 35 each have a respective width, measured along the axis Y, which decreases going from respective ends 32', 32" of the main body 32 (opposite to each other along the alignment axis 38) to the connection portion 36. Furthermore, optionally the ends 32' and 32" may have a semicircular profile parallel to the XY plane.

In greater detail and with reference to FIG. 3A, the main body 32 has, in the XY plane: a first maximum dimension $L_1$ (e.g., maximum length of the main body 32) which is measured along the alignment axis 38, between the ends 32' and 32"; and a second maximum dimension $L_2$ (e.g., maximum width of the main body 32) which is measured orthogonally to the alignment axis 38 (in detail, along the axis Y) and is smaller than the first maximum dimension $L_1$. Furthermore, in the embodiment of FIG. 3A, the second maximum dimension $L_2$ is measured at one of the rigid portions 34, 35 (herein exemplarily the first rigid portion 34) and the connection portion 36 has a third maximum dimension $L_3$ which is measured orthogonally to the alignment axis 38 (in detail, along the axis Y) and is smaller than the second maximum dimension $L_2$.

For example, the first maximum dimension $L_1$ is comprised between about 8 cm and about 20 cm (preferably between about 8.5 cm and about 15 cm), the second maximum dimension $L_2$ is comprised between about 2.5 cm and about 5 cm and the third maximum dimension $L_3$ is comprised between about 2 cm and about 4.5 cm. More generally, a ratio between the third maximum dimension $L_3$ and the second maximum dimension $L_2$ is comprised between about 65% and about 95% and a ratio between the second maximum dimension $L_2$ and the first maximum dimension $L_1$ is comprised between about 20% and about 40%.

At least one of the first and the second rigid portions 34 and 35 define therewithin a respective internal space (not shown). In the exemplarily considered embodiment, the first and the second rigid portions 34 and 35 respectively define a first and a second internal space, for example fluidically isolated from each other.

The main body 32 accommodates in the internal spaces a control circuitry (schematically shown in FIG. 4 with reference 39), which is configured to control the biomedical device 30 and to acquire the physiological parameters of the patient. In particular, the control circuitry 39 acquires in use electrical signals indicative of said physiological parameters. For example, the control circuitry 39 is comprised and divided into the first and the second internal spaces and the elements of the control circuitry 39 present in internal spaces different from each other are in electrical connection to each other through electrical connections 39a (in detail, electrical cables and/or buses) which extend into the connection portion 36, between the rigid portions 34 and 35. For purely illustrative purposes, the control circuitry 39 comprises a control unit 39b (such as a microprocessor, a CPU, an ASIC or a dedicated microcontroller) and a memory unit 39c (e.g., volatile and/or non-volatile memory), and may further comprise an interface unit 39d (e.g., comprising amplifiers, filters and ADC converters and configured to process the sensed signals of the physiological parameters) and a data communication unit 39e (for transmitting and receiving data towards an external apparatus such as the patient's mobile phone or a doctor's PC).

Optionally, at least one of the first and the second rigid portions 34 and 35 may comprise user interface elements 37, such as buttons operable by the patient (e.g., to switch on or off the biomedical device 30) and/or signaling LEDs for the patient. (e.g., of the charge state of the biomedical device 30 or of abnormal conditions of the physiological parameters).

Figure 5:
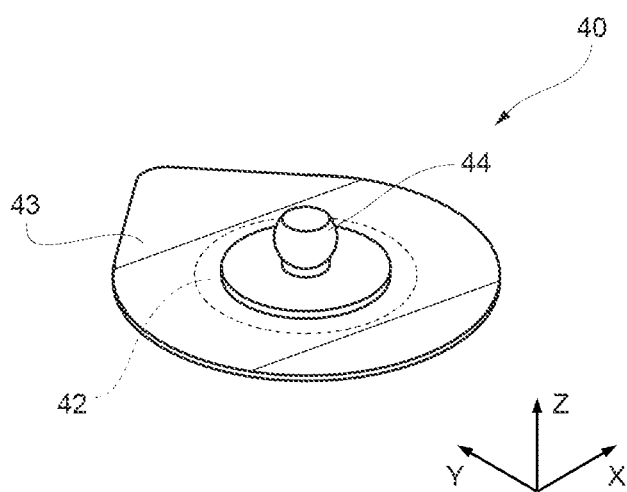
FIG. 5 is a perspective view of an electrode, couplable to the main body of the biomedical device of FIG. 3A.

The biomedical device 30 also comprises a plurality of electrodes (an example is shown in FIG. 5 with reference number 40) for electrocardiogram (ECG), hereinafter thereby also referred to as ECG electrodes 40. For example, FIG. 5 is a perspective view of an electrode 40, couplable to the main body 32 of the biomedical device 30. ECG electrodes 40 are standardized and disposable, and are commonly found on the market. Specifically, each ECG electrode 40 comprises a respective metal sensitive element 42 and a respective patch 43. The patch 43 is configured to allow the coupling (in detail, the temporary bonding) of the ECG electrode 40 to the skin of the patient, and the sensitive element 42 is configured to be placed in contact with the skin of the patient (e.g., on the torso of the patient) and to sense said electrical signals correlated to electrical potentials present on the skin and generated by cardiac activity (in detail, due to periodic debiasing and rebiasing of the heart). In greater detail, the sensitive element 42 of each ECG electrode 40 has an ECG protrusion 44 (e.g., substantially of spherical shape) extending on the opposite side of the sensitive element 42 with respect to the surface of the sensitive element 42 placed in contact, in use, with the skin of the patient.

In the embodiment of FIGS. 3A, 3B and 4 a first and a second ECG electrode (also common to the embodiment of FIGS. 8 and 9, better discussed hereinafter, wherein they are indicated with respective references 40a and 40b) are present.

ECG electrodes 40a and 40b are selectively couplable, in a releasable manner, to the main body 32. In this manner it is possible, by bonding the ECG electrodes 40a and 40b to the skin of the patient and coupling the main body 32 to the ECG electrodes 40a and 40b, to attach the main body 32 to the torso of the patient to carry out the measurement of the physiological parameters.

In particular, the first ECG electrode 40a is couplable by shape coupling to the first rigid portion 34 and the second ECG electrode 40b is couplable by shape coupling to the second rigid portion 35. In greater detail, the first rigid portion 34 has a first ECG seat 47, with shape complementary to the ECG protrusion 44 of the sensitive element 42, which is for coupling to the ECG protrusion 44 of the sensitive element 42 of the first ECG electrode 40a to couple the first rigid portion 34 and the first ECG electrode 40a to each other, and the second rigid portion 35 has a second ECG seat 48, with shape complementary to the ECG protrusion 44 of the sensitive element 42, which is for coupling to the ECG protrusion 44 of the sensitive element 42 of the second ECG electrode 40b to couple the second rigid portion 35 and the second ECG electrode 40b to each other. The ECG seats 47 and 48 are formed in the first surfaces 34a and 35a of the rigid portions 34 and 35, so as to face towards the skin of the patient. In detail, the ECG seats 47 and 48 are of conductive material and operate both as selective coupling groups, together with the ECG protrusions 44, to mechanically couple the rigid portions 34 and 35 with the ECG electrodes 40, and as electrical connections to allow electrical coupling between the ECG electrodes 40 and the control circuitry 39 since electrical connections (not shown) are present between the ECG seats 47 and 48 and the control circuitry 39.

Specifically, the ECG seats 47 and 48 are distant from each other by a distance between electrodes (or mutual distance) $L_4$ (FIG. 4; e.g., measured between the centers of the ECG seats 47 and 48, for example along the alignment axis 38) which is preferably greater than about 8-9 cm, and is generally comprised between about 7 cm and about 14 cm.

Figure 6:
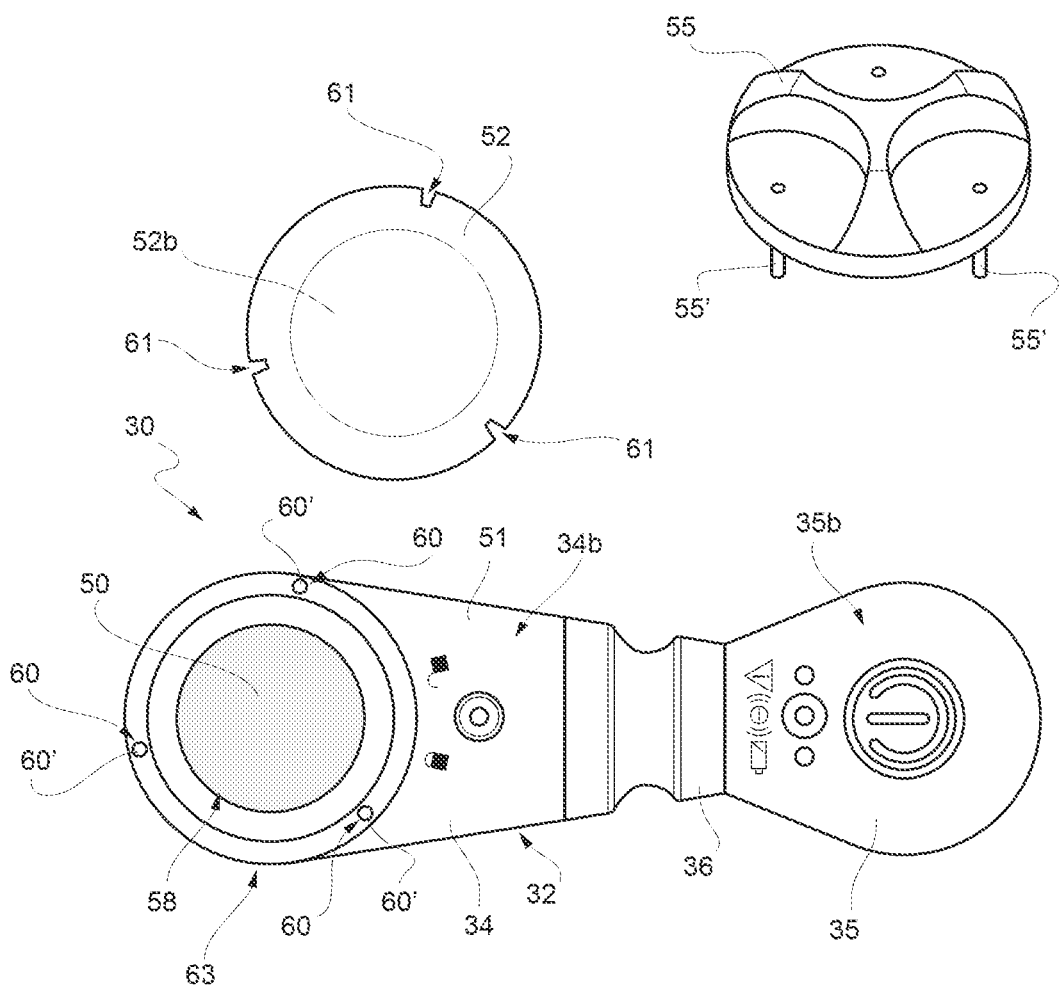
FIG. 6 shows a partially exploded perspective view of the main body of the biomedical device of FIG. 3A, comprising a main portion and a lid portion, and shows a perspective view of a release element of the biomedical device, couplable to the main body to decouple the main portion and the lid portion from each other.

FIG. 6 shows a partially exploded perspective view of the main body 32 of the biomedical device 30, comprising a main portion 51 and a lid portion 52, and shows a perspective view of a release element 55 of the biomedical device 30, couplable to the main body 32 to decouple the main portion 51 and the lid portion 52 from each other.

As better shown in FIG. 6, the main body 32 also accommodates a battery 50, of a known type (in detail, a button battery) and decouplable from the main body 32. For example, the battery 50 may be of rechargeable or disposable (throwaway) type. In particular, the battery 50 is accommodated in a portion of one of the internal spaces of the rigid portions 34 and 35.

As shown in FIG. 6 and considered hereinafter for purely illustrative and non-limiting purposes, the battery 50 is accommodated in the first internal space of the first rigid portion 34. In particular, the first rigid portion 34 comprises a main portion 51 attached to the connection portion 36, and a lid portion 52 couplable, in a releasable manner, to the main portion 51 and extending at the second surface 34b of the first rigid portion 34 (i.e., on the opposite side of the main body 32 with respect to the ECG electrodes 40 and to the patient). The lid portion 52 has a first face (not shown) and a second face 52b opposite to the first face along the axis Z. In a closing condition of the first rigid portion 34, the lid portion 52 is coupled to the main portion 51 (with the first face facing the first internal space and the second face 52b facing the environment external to the biomedical device 30) in such a way that it fluidically isolates the first internal space (and therefore the battery 50) with respect to the environment external to the biomedical device 30. In an opening condition of the first rigid portion 34, the lid portion 52 is decoupled from the main portion 51 and the first internal space (and therefore the battery 50) faces the external environment and communicates fluidically with the latter.

In detail, the lid portion 52 is couplable to the main portion 51 by shape coupling, and optionally also by a safety mechanism which prevents accidental and undesired decoupling.

Figure 7:
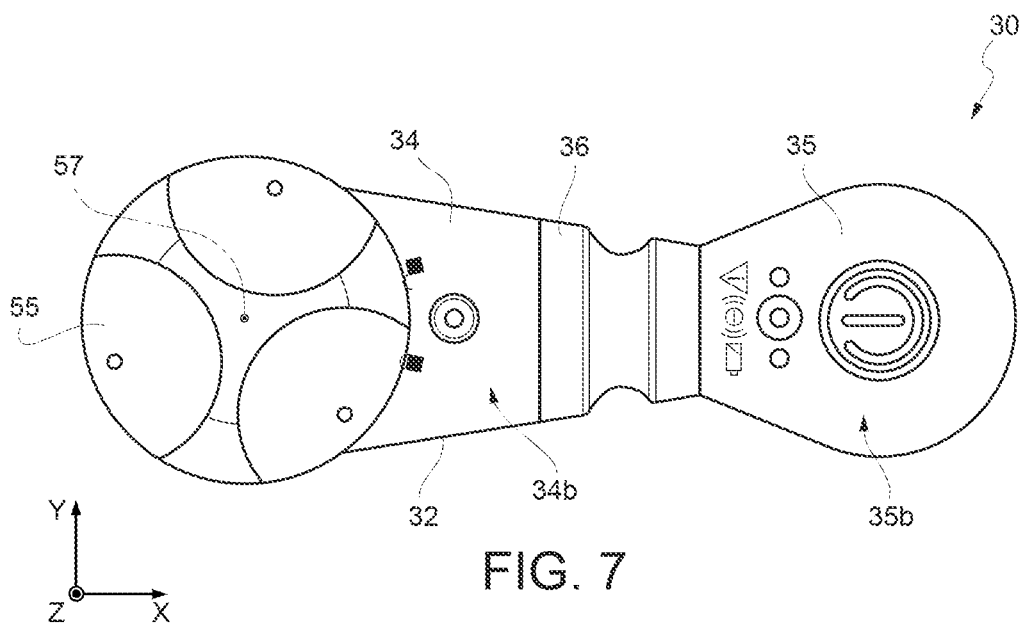
FIG. 7 is a top view of the release element of FIG. 6 coupled to the main body of the biomedical device of FIG. 3A.

Specifically, the main portion 51 has, at the second surface 34b, a coupling portion 63 of circular shape which defines an opening 58 in the second surface 32b, wherethrough the first internal space may communicate fluidically with the external environment. The coupling portion 63 (and therefore the opening 58) has a shape complementary to the lid portion 52 and such that the battery 50 is insertable into the first internal space through the opening 58. The lid portion 52 has a circular-shaped lateral edge which has a thread, and the coupling portion 63 has a shape complementary to the lid portion 52 so as to allow a mutual coupling. In use, the lid portion 52 is coupled to the coupling portion 63 of the main portion 51 through coaxial rotation of the lid portion 52 in the opening 58, around a rotation axis (shown in FIG. 7 with reference 57, orthogonal to the second surface 32b and here exemplarily parallel to the axis Z), which causes the lid portion 52 to fit into the coupling portion 63, thus obstructing the opening 58. FIG. 7 is a top view of the release element 55 coupled to the main body of the biomedical device 30.

Furthermore, one or more pogo pin elements 60 are carried by the coupling portion 63 and may protrude towards the lid portion 52 (i.e., orthogonally to the second surface 32b), to form said safety mechanism as better described below. In the embodiment exemplarily shown in FIG. 6 and considered hereinafter, three pogo pin elements 60 are present extending at the thread of the coupling portion 63, for example so that they are angularly equi-spaced from each other with respect to the rotation axis 57. In detail, each pogo pin element 60 has a first protrusion 60' attached, through a respective spring (not shown) having a respective deformation (contraction/elongation) axis parallel to the rotation axis 57, to a respective accommodation cavity (not shown) formed in the coupling portion 63, from the second surface 32b and towards the first internal space. Each pogo pin element 60 is operable in two positions: in a first position of the pogo pin element 60 (rest position), the spring is not subject to contraction forces along the deformation axis (the spring is in an extended condition), has a first length along the deformation axis and the first protrusion 60' of the pogo pin element 60 protrudes, along the axis Z, outside the respective accommodation cavity in the opposite direction with respect to the first internal space; in a second position of the pogo pin element 60 (contraction position), the spring is subject to contraction forces which act along the deformation axis towards the first internal space (the spring is in a compressed condition) and has a second length along the deformation axis smaller than the first length and such that the first protrusion 60' of the pogo pin element 60 is contained in the respective accommodation cavity and does not protrude towards the lid portion 52 (in other words, it extends along the axis Z level with the coupling portion 63).

The lid portion 52 also has a shape coupling with the pogo pin elements 60. In particular, the lid portion 52 has, at its lateral edge, a respective coupling cavity 61 (more generally, a respective coupling opening 61) for each pogo pin element 60, extending from the first to the second face 52b in such a way that it traverses the lid portion 52 parallel to the rotation axis 57. The coupling cavities 61 have a shape complementary to the first protrusions 60' of the pogo pin elements 60 and are arranged in such a way that when the pogo pin elements 60 are in the first positions the respective first protrusions 60' extend into the coupling cavities 61 thus preventing the lid portion 52 from rotating around the rotation axis 57 (while when the pogo pin elements 60 are in the second positions the respective first protrusions 60' do not extend into the coupling cavities 61 thus allowing the rotation of the lid portion 52 around the rotation axis 57). As a result, the pogo pin elements 60 and the coupling cavities 61 form said safety mechanism operable in a first condition (first position of the pogo pin elements 60) or in a second condition (second position of the pogo pin elements 60).

The mutual coupling and decoupling of the lid portion 52 and the coupling portion 63 of the main portion 51 are performed by using a release element 55 of the biomedical device 30, couplable in a releasable manner to the lid portion 52 (from the opposite side of the lid portion 52 with respect to the main portion 51, and therefore at the second face 52b). Specifically, the release element 55 has a shape coupling with the lid portion 52, and in detail has respective second protrusions 55' (one for each coupling cavity 61, having shapes and arrangements complementary to the coupling cavities 61).

In use, the release element 55 allows the lid portion 52 and the main portion 51 to be decoupled from each other. When the release element 55 is pressed against the second face 52b of the lid portion 52 coupled to the main portion 51 (FIG. 7), its second protrusions 55' insert into the coupling cavities 61 and push the first protrusions 55' of the pogo pin elements 60 downwards (i.e., towards the first internal space), generating said contraction forces along the deformation axes of the springs of the pogo pin elements 60, and therefore cause the pogo pin elements 60 to pass from their first position to their second position. Thereafter, the release element 55 is rotated around the rotation axis 57 (e.g., rotated by a predefined rotation angle in a first rotation direction, for example by about 90° counterclockwise) and the lid portion 52 (no longer constrained by the pogo pin elements 60 which are now in their second position) moves integrally with the release element 55. As a result, the lid portion 52 and the main portion 51 sliding cooperate with each other as threaded elements as a function of the rotation around the rotation axis 57, up to achieving the decoupling of the lid portion 52 from the main portion 51.

Furthermore, in use, the release element 55 allows the lid portion 52 and the main portion 51 to be coupled to each other. This occurs by performing the following steps in succession to each other: coupling the lid portion 52 to the release element 55 by fitting the second protrusions 55' into the coupling cavities 61; coupling the lid portion 52 and the release element 55 with the main portion 51 and rotating in an integral manner the lid portion 52 and the release element 55 inside the opening 58, around the rotation axis 57 and in a second rotation direction opposite to the first rotation direction, to couple the lid portion 52 with the coupling portion 63; and decoupling the lid portion 52 and the release element 55 from each other to move the pogo pin elements 60 from their second position to their first position, thus attaching the lid portion 52 to the main portion 51. Alternatively, the coupling of the lid portion 52 with the main portion 51 may also be performed manually by the patient without using the release element 55, simply by pressing the lid portion 52 on the coupling portion 63 and rotating it with respect to the latter until fitting the first protrusions 55' of the pogo pin elements 60 into the coupling cavities 61.

Figure 8:
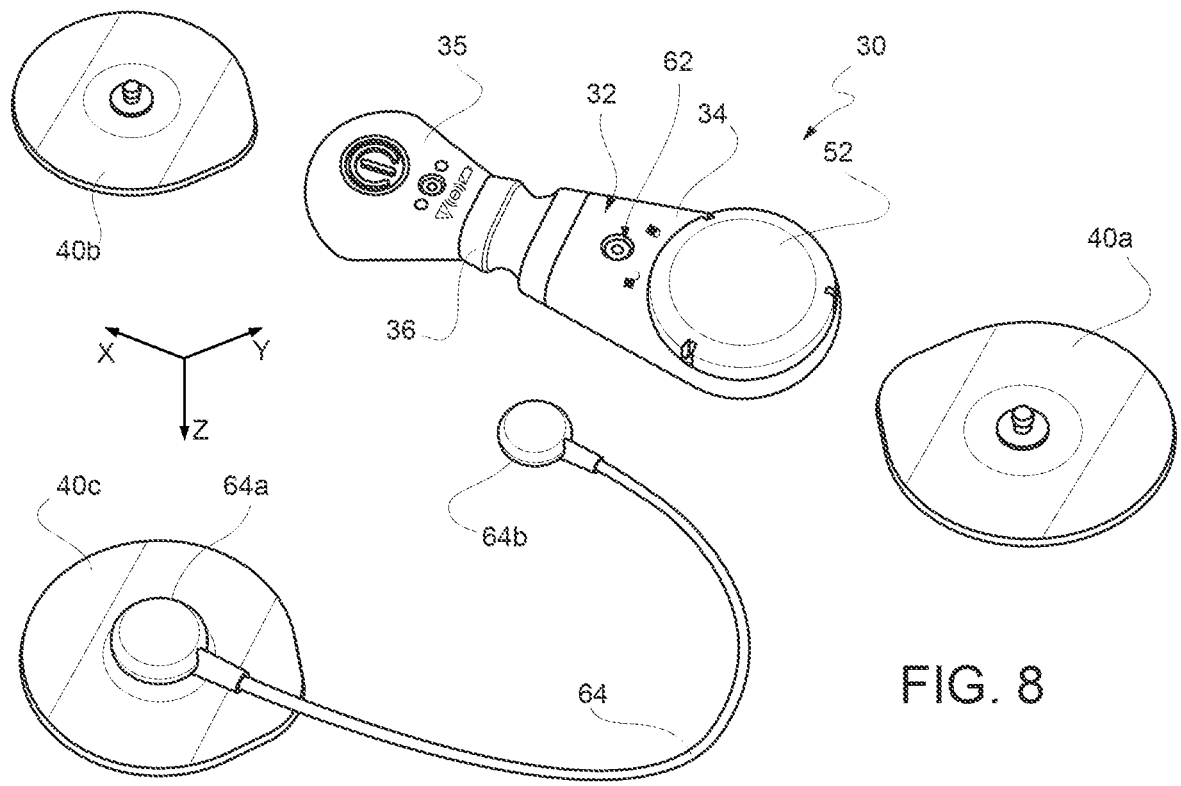
FIG. 8 is an exploded view of a further embodiment of the biomedical device.
Figure 9:
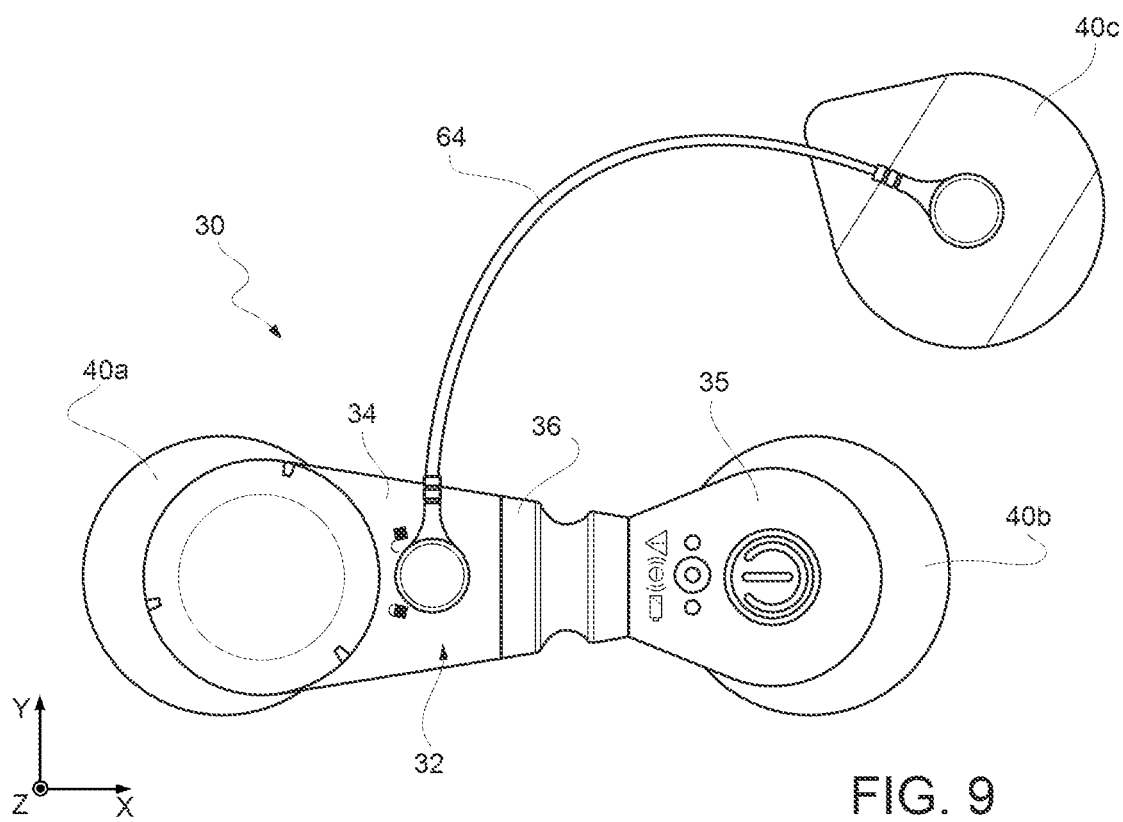
FIG. 9 is a top view of the biomedical device of FIG. 8.

FIG. 8 is an exploded view of a further embodiment of the biomedical device 30. FIG. 9 is a top view of the biomedical device 40 of FIG. 8.

According to a different embodiment of the biomedical device 30 shown in FIGS. 8 and 9, the latter also comprises a third ECG electrode 40c, similar to the ECG electrodes 40a and 40b, and a connection assembly 64 of the main body 32 to physically and electrically connect the third ECG electrode 40c to the first or the second rigid portions 34, 35. In detail, the connection assembly 64 is flexible and is of filiform type (e.g., it is an electrical connection cable) and has a first and a second end 64a and 64b, the first end 64a being couplable in a releasable manner to the third ECG electrode 40c (e.g., through shape coupling) and the second end 64b being coupled in a releasable manner to the main body 32 (e.g., to an ECG electrical connection 62 of one of the rigid portions 34 and 35, for example through magnetic or shape coupling). In this manner the control circuitry 39 may acquire the electrical signals sensed by three ECG electrodes 40.

Figure 10A:
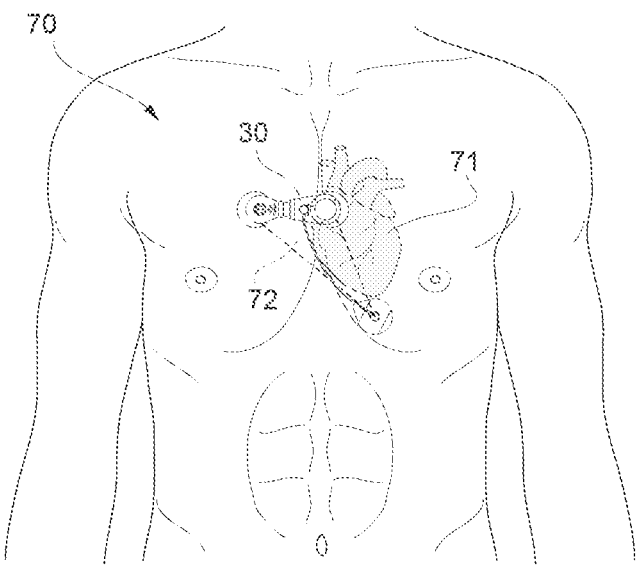
FIGS. 10A-10C schematically show possible arrangements of the biomedical device of FIG. 8 on the torso of the patient.
Figure 10B:
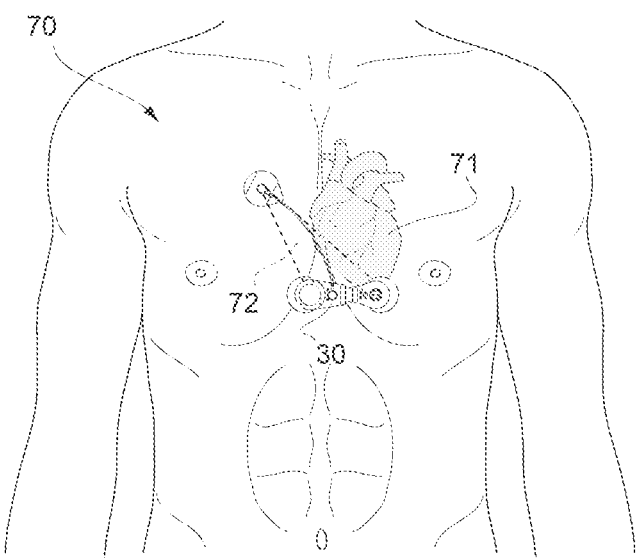
Figure 10C:
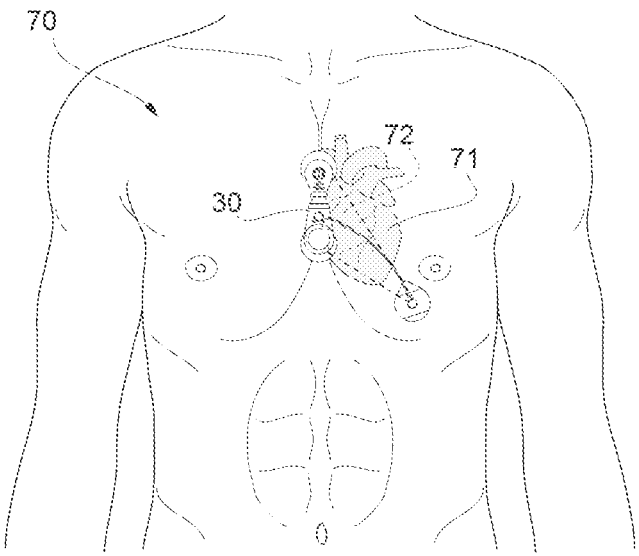

FIGS. 10A-10C show examples of arrangements of the biomedical device 30 of FIGS. 8 and 9 on the torso (here indicated with reference number 70) of the patient. For example, the main body 32 may extend horizontally or vertically with respect to the torso 70 of the patient. In general, the ECG electrodes 40a, 40b and 40c have a triangle arrangement with each other (i.e., they are not all aligned with each other). In other words, the ECG electrodes 40a, 40b and 40c define a sensing region 72 of triangular shape on the torso 70 of the patient, which is at least partially superimposed on the heart (here indicated with reference number 71) of the patient.

From an examination of the characteristics of the various embodiments made according to the present disclosure, the advantages that it affords are evident.

In particular, the biomedical device 30 has reduced dimensions and weight, improving the wearability thereof by the patient, and is easy to use (e.g., the magnetic connection of the connection assembly 64 to the main body 32 is of self-centering type to simplify the mounting thereof by the patient, and both the replacement of the battery 50 and the coupling of the third ECG electrode 40c with the main body 32 may be performed even while the patient is wearing the main body 32, i.e., without the need to have to remove the latter). In detail, the deformation of the biomedical device 30 allowed by the connection portion 36 reduces the patient's discomfort during the monitoring of the physiological parameters also in consideration of the fact that, in order to have a correct measurement of the physiological parameters related to cardiac activity, the first and the second ECG electrodes 40a and 40b cannot be placed at a mutual distance lower than 9 cm. Furthermore, the tapered shape of the rigid portions 34 and 35 adapts better than the currently known solutions to the conformation of the torso 70 of the patient, especially if female.

The rigid portions 34 and 35 and the connection portion 36 are of biocompatible plastic material (e.g., thermoplastic polyurethane, TPU), and this prevents risks for the patient's health.

The internal spaces are fluidically isolated from the external environment when the lid portion 52 is coupled to the main portion 51, and this makes the biomedical device 30 impermeable (in particular, with IP67 certification) and therefore not subject to measurement errors resulting from humidity and patient's sweat.

The ECG electrodes 40 and the battery 50 are of standard type and commonly on the market, and this reduces the use and maintenance cost of the biomedical device 30.

Furthermore, the measuring of physiological parameters may be performed with both two ECG electrodes 40 and three ECG electrodes 40, with a consequent improvement in measurement accuracy.

Furthermore, the safety mechanism formed by the pogo pin elements 60 and the coupling cavities 61 and the use of the release element 55 to decouple the lid portion 52 from the main portion 51 prevent accidental openings of the lid portion 52, improving safety and reliability thereof.

During the replacement of the battery 50, the removal of the biomedical device 30 from the body of the patient is not required.

Finally, it is clear that modifications and variations may be made to the various embodiments described and illustrated herein without thereby departing from the scope of the present disclosure. For example, the different embodiments described herein may be combined with each other to provide further solutions.

Furthermore, the rigid portions 34 and 35 and the connection portion 36 of the biomedical device 30 may have different shapes with respect to what has been previously described. For example, the rigid portions 34 and 35 may be rectangular and not have a tapered shape, and the ends 32' and 32" may not have a circular shape but have a triangular or, more generally, a polygonal shape.

A solid body (32) for a biomedical device (30), the solid body (32) being wearable by a patient and being configured to acquire one or more physiological parameters of the patient, may be summarized as including a first rigid portion (34), a second rigid portion (35) and a connection portion (36) of flexible type which couples the first (34) and the second (35) rigid portions to each other, and a control circuitry (39) accommodated inside the first (34) and/or the second (35) rigid portions. The connection portion (36) is interposed between the first (34) and the second (35) rigid portions, is integral with the first (34) and the second (35) rigid portions and is deformable to allow a relative movement of the first (34) and the second (35) rigid portions. The first rigid portion (34) is physically couplable, in a releasable manner, to a first ECG electrode (40a) of the biomedical device (30) and the second rigid portion (35) is physically couplable, in a releasable manner, to a second ECG electrode (40b) of the biomedical device (30), the solid body (32) being couplable to a torso (70) of the patient through the first (40a) and the second (40b) ECG electrodes. When the first (34) and the second (35) rigid portions are coupled to the first (40a) and, respectively, the second (40b) ECG electrode, the control circuitry (39) is electrically coupled to the first (40a) and the second (40b) ECG electrodes and is configured to acquire, through the first (40a) and the second (40b) ECG electrodes, respective electrical signals indicative of said one or more physiological parameters.

When the solid body (32) is in a rest condition, the connection portion (36) may not be deformed and the first rigid portion (34), the connection portion (36) and the second rigid portion (35) may be aligned with each other along an alignment axis (38). When the solid body (32) is in a deformed condition, the connection portion (36) is deformed and the first rigid portion (34), the connection portion (36) and the second rigid portion (35) may be misaligned with each other along the alignment axis (38).

The first rigid portion (34) may have a first surface (34a) configured to face the torso (70) of the patient and comprising a first ECG seat (47) configured to have shape coupling with the first ECG electrode (40a); and a second surface (34b) opposite to the first surface (34a) with respect to the first rigid portion (34. The second rigid portion (35) may have a respective first surface (35a) configured to face the torso (70) of the patient and may include a second ECG seat (48) configured to have shape coupling with the second ECG electrode (40b); and a respective second surface (35b) opposite to the first surface (35a) of the second rigid portion (35) with respect to the second rigid portion (35).

When the solid body (32) is in the rest condition, the first and the second ECG seats (47, 48) may have a mutual distance ($L_4$) comprised between 7 cm and 14 cm.

The first rigid portion (34) may define a first internal space of the solid body (32) wherein a battery (50) of the solid body (32) may be accommodated, in a removable manner. The first rigid portion (34) may be formed by a main portion (51) attached to the connection portion (36) and including, at the second surface (34b) of the first rigid portion (34), a coupling portion (63) defining an opening (58) wherethrough the battery (50) is removable from the first internal space; and a lid portion (52) with shape complementary to the coupling portion (63) and coupled, through shape coupling and in a releasable manner, to the coupling portion (63) of the main portion (51). When the lid portion (52) is coupled to the coupling portion (63) of the main portion (51), the opening (58) may be obstructed by the lid portion (52) and the first internal space is fluidically isolated with respect to an environment external to the solid body (32). When the lid portion (52) is decoupled from the coupling portion (63) of the main portion (51), the first internal space may be in fluidic connection with the external environment through the opening (58).

The lid portion (52) may have a circular shape and may have a thread configured to cooperate with the coupling portion (63), the lid portion (52) being decouplable from the coupling portion (63) and couplable to the coupling portion (63) through relative rotation of the lid portion (52) and of the coupling portion (63), in a first rotation direction and respectively in a second rotation direction opposite to the first rotation direction, around a rotation axis (57) orthogonal to the alignment axis (38). The lid portion (52) and the coupling portion (63) may further have a safety mechanism (60, 61) which, in a first condition, prevents relative rotation of the lid portion (52) and of the coupling portion (63) and, in a second condition, allows relative rotation of the lid portion (52) and of the coupling portion (63).

The coupling portion (63) may include one or more pogo pin elements (60) operable in a first position or in a second position, and the lid portion (52) may include one or more respective coupling openings (61) with shape complementary to the one or more pogo pin elements (60), the one or more pogo pin elements (60) and the one or more respective coupling openings (61) forming said safety mechanism (60, 61). In said first condition of the safety mechanism (60, 61), the one or more pogo pin elements (60) may be in the first position and protrude, transversely to the second surface (34b) of the first rigid portion (34), in the one or more respective coupling openings (61) to prevent relative rotation of the lid portion (52) and of the coupling portion (63). In said second condition of the safety mechanism (60, 61), the one or more pogo pin elements (60) may be in the second position and do not protrude into the one or more respective coupling openings (61), thus allowing relative rotation of the lid portion (52) and of the coupling portion (63).

Each pogo pin element (60) may include a first protrusion (60') attached, through a respective spring having a respective deformation axis parallel to the rotation axis (57), to a respective accommodation cavity formed in the coupling portion (63). When the pogo pin elements (60) are in the first position, the respective springs may be in an extended condition and the respective first protrusions (60') protrude outside the respective accommodation cavities. When the pogo pin elements (60) are in the second position, the respective springs may be in a compressed condition and the respective first protrusions (60') may be contained inside the respective accommodation cavities.

The lid portion (52) may have a first face facing the first internal space, and a second face (52b) opposite to the first face along the rotation axis (57) and facing the external environment. The one or more coupling openings (61) extend through the lid portion (52), from the first face to the second face (52b). The solid body (32) may further include a release element (55) couplable, through shape coupling and in a releasable manner, to the lid portion (52) in such a way that the second face (52b) of the lid portion (52) faces the release element (55), the release element (55) may include a respective second protrusion (55') for each coupling opening (61). When the release element (55) is decoupled from the lid portion (52), the safety mechanism (60, 61) is in the first condition. When the release element (55) is coupled to the lid portion (52), the one or more second protrusions (55') extend into the one or more coupling openings (61) causing the one or more pogo pin elements (60) to move from the first position to the second position and therefore taking the safety mechanism (60, 61) to the second condition, and further making the lid portion (52) integral with the release element (55) to rotations of the release element (55) around the rotation axis (57).

The solid body may further include a connection assembly (64) of flexible and filiform type, having a first end (64a) and a second end (64b) opposite to each other, the first end (64a) being couplable, in a releasable manner, through shape coupling, to a third ECG electrode (40c) of the biomedical device (30), and the second end (64b) being coupled, in a releasable manner, through shape coupling or magnetically, to the first rigid portion (34) or to the second rigid portion (35). When the first rigid portion (34) or the second rigid portion (35) is coupled to the third ECG electrode (40c) through the connection assembly (64), the control circuitry (39) is also electrically coupled to the third ECG electrode (40c) and is also configured to acquire, through the third ECG electrode (40c), a further electrical signal indicative of said one or more physiological parameters.

The first rigid portion (34) and the second rigid portion (35) may have, along the alignment axis (38), a tapered shape towards the connection portion (36).

The solid body (32) may have along the alignment axis (38) a maximum dimension having a first value ($L_1$). The first rigid portion (34) and/or the second rigid portion (35) may have, orthogonally to the alignment axis (38) and to the rotation axis (57), a respective maximum dimension having a second value ($L_2$), a ratio between the second value ($L_2$) and the first value ($L_1$) being comprised between 20% and 40%. The connection portion (36) may have, orthogonally to the alignment axis (38) and to the rotation axis (57), a respective maximum dimension having a third value ($L_3$), a ratio between the third value ($L_3$) and the second value ($L_2$) being comprised between 65% and 95%.

A biomedical device (30) for acquiring one or more physiological parameters of a patient and being wearable by the patient, may be summarized as including a solid body (32) including a first rigid portion (34), a second rigid portion (35), a connection portion (36) of flexible type which couples the first (34) and the second (35) rigid portions to each other, and a control circuitry (39) accommodated inside the first (34) and/or the second (35) rigid portion; a first ECG electrode (40a); and a second ECG electrode (40b). The connection portion (36) is interposed between the first (34) and the second (35) rigid portions, is integral with the first (34) and the second (35) rigid portions and is deformable to allow a relative movement of the first (34) and the second (35) rigid portions. The first rigid portion (34) is physically coupled, in a releasable manner, to the first ECG electrode (40a) and the second rigid portion (35) is physically coupled, in a releasable manner, to the second ECG electrode (40b), the solid body (32) being couplable to a torso

(70) of the patient through the first (40a) and the second (40b) ECG electrodes. When the first (34) and the second (35) rigid portions are coupled to the first (40a) and, respectively, the second (40b) ECG electrode, the control circuitry (39) is electrically coupled to the first (40a) and the second (40b) ECG electrodes and is configured to acquire, through the first (40a) and the second (40b) ECG electrodes, respective electrical signals indicative of said one or more physiological parameters.

Each of the first ECG electrode (40a) and the second ECG electrode (40b) may include a sensitive element (42) of conductive material, including an ECG protrusion (44) coupled, in a releasable manner, to the first rigid portion (34) or, respectively, to the second rigid portion (35); and a patch (43) attached to the sensitive element (42) and configured to couple the sensitive element (42) to the torso (70) of the patient.

The biomedical device may further include a third ECG electrode (40c). The solid body (32) may further include a connection assembly (64) of flexible and filiform type, having a first end (64a) and a second end (64b) opposite to each other, the first end (64a) being coupled, in a releasable manner, through shape coupling, to the third ECG electrode (40c), and the second end (64b) being coupled, in a releasable manner, through shape coupling or magnetically, to the first rigid portion (34) or to the second rigid portion (35). When the first rigid portion (34) or the second rigid portion (35) is coupled to the third ECG electrode (40c) through the connection assembly (64), the control circuitry (39) is also electrically coupled to the third ECG electrode (40c) and is also configured to acquire, through the third ECG electrode (40c), a further electrical signal indicative of said one or more physiological parameters.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A solid body for a biomedical device, the solid body comprising:
    a first rigid portion including:
        a coupling portion having one or more pogo pin elements; and
        a threaded lid portion configured to couple with the coupling portion, the lid portion having one or more respective coupling openings configured to receive the one or more pogo pin elements;
    a second rigid portion;
    a connection portion of a flexible type that couples the first and the second rigid portions to each other; and
    control circuitry inside the first rigid portion or the second rigid portion,
    wherein the connection portion is between the first and the second rigid portions, is integral with the first and the second rigid portions, and is deformable to allow a relative movement of the first and the second rigid portions,
    wherein the first rigid portion is physically couplable, in a releasable manner, to a first electrocardiogram (ECG) electrode of the biomedical device, and the second rigid portion is physically couplable, in a releasable manner, to a second ECG electrode of the biomedical device,
    wherein the solid body is wearable by a patient and couplable to a torso of the patient through the first and the second ECG electrodes, and
    wherein, in a case where the first and the second rigid portions are coupled to the first and the second ECG electrodes, respectively, the control circuitry is electrically coupled to the first and the second ECG electrodes and is configured to acquire, through the first and the second ECG electrodes, respective electrical signals indicative of one or more physiological parameters.

2. The solid body according to claim 1, wherein,
    in a case where the solid body is in a rest condition, the connection portion is not deformed, and the first rigid portion, the connection portion, and the second rigid portion are aligned with each other along an alignment axis, and
    in a case where the solid body is in a deformed condition, the connection portion is deformed, and the first rigid portion, the connection portion and the second rigid portion are misaligned with each other along the alignment axis.

3. The solid body according to claim 2, wherein the first rigid portion and the second rigid portion have, along the alignment axis, a tapered shape towards the connection portion.

4. The solid body according to claim 2,
    wherein the first rigid portion includes:
        a first surface configured to face the torso of the patient, the first surface including a first ECG seat configured to have shape coupling with the first ECG electrode; and
        a second surface opposite to the first surface, and
    wherein the second rigid portion includes:
        a third surface configured to face the torso of the patient, the third surface including a second ECG seat having a shape configured to couple with the second ECG electrode; and
        a fourth surface opposite to the third surface.

5. The solid body according to claim 4, wherein, in a case where the solid body is in the rest condition, the first and the second ECG seats have a mutual distance that is between 7 cm and 14 cm.

6. The solid body according to claim 4,
    wherein the first rigid portion defines a first internal space of the solid body configured to accommodate a battery in a removable manner,
    wherein the first rigid portion includes:
        a main portion attached to the connection portion and including, at the second surface of the first rigid portion, the coupling portion defining an opening in which the battery is removable from the first internal space,
        wherein the lid portion has a shape complementary to the coupling portion and configured to couple, through shape coupling and in a releasable manner, to the coupling portion of the main portion,
    wherein, in a case where the lid portion is coupled to the coupling portion of the main portion, the opening is obstructed by the lid portion and the first internal space is fluidically isolated with respect to an environment external to the solid body, and
    wherein, in a case where the lid portion is decoupled from the coupling portion of the main portion, the first internal space is in fluidic connection with the environment through the opening.

7. The solid body according to claim 6,
wherein the lid portion has a circular shape,
wherein the lid portion is decouplable from the coupling portion and couplable to the coupling portion through relative rotation of the lid portion and of the coupling portion, in a first rotation direction and in a second rotation direction opposite to the first rotation direction, respectively, around a rotation axis orthogonal to the alignment axis, and
wherein the lid portion and the coupling portion further have a safety mechanism which, in a first condition, prevents relative rotation of the lid portion and of the coupling portion and, in a second condition, allows relative rotation of the lid portion and of the coupling portion.

8. The solid body according to claim 7,
wherein the solid body has along the alignment axis a first maximum dimension having a first value,
wherein the first rigid portion or the second rigid portion has, orthogonally to the alignment axis and to the rotation axis, a second maximum dimension having a second value, a ratio between the second value and the first value being comprised between 20% and 40%, and
wherein the connection portion has, orthogonally to the alignment axis and to the rotation axis, a third maximum dimension having a third value, a ratio between the third value and the second value being comprised between 65% and 95%.

9. The solid body according to claim 7,
wherein the one or more pogo pin elements are operable in a first position and in a second position, and the one or more respective coupling openings having a shape complementary to the one or more pogo pin elements, the safety mechanism including the one or more pogo pin elements and the one or more respective coupling openings,
wherein, in the first condition of the safety mechanism, the one or more pogo pin elements are in the first position and protrude, transversely to the second surface of the first rigid portion, in the one or more respective coupling openings to prevent relative rotation of the lid portion and of the coupling portion, and
wherein in the second condition of the safety mechanism, the one or more pogo pin elements are in the second position and do not protrude into the one or more respective coupling openings to allow relative rotation of the lid portion and of the coupling portion.

10. The solid body according to claim 9,
wherein each pogo pin element includes a first protrusion attached, through a respective spring having a respective deformation axis parallel to the rotation axis, to a respective accommodation cavity formed in the coupling portion,
wherein when the one or more pogo pin elements are in the first position, the respective springs are in an extended condition and the respective first protrusions protrude outside the respective accommodation cavities, and
wherein, in a case where the pogo pin elements are in the second position, the respective springs are in a compressed condition and the respective first protrusions are contained inside the respective accommodation cavities.

11. The solid body according to claim 10,
wherein the lid portion has a first face facing the first internal space, and a second face opposite to the first face along the rotation axis and facing the environment,
wherein the coupling openings extend through the lid portion, from the first face to the second face,
wherein the solid body includes a release element couplable, through shape coupling and in a releasable manner, to the lid portion in such a way that the second face of the lid portion faces the release element, the release element including a respective second protrusion for each coupling opening,
wherein, in a case where the release element is decoupled from the lid portion, the safety mechanism is in the first condition, and
wherein, in a case where the release element is coupled to the lid portion, the second protrusions extend into the one or more coupling openings causing the one or more pogo pin elements to move from the first position to the second position such that the safety mechanism is in the second condition, and making the lid portion integral with the release element to rotations of the release element around the rotation axis.

12. The solid body according to claim 1, further comprising:
a connection assembly of flexible and filiform type, having a first end and a second end opposite to each other,
the first end being couplable, through shape coupling and in a releasable manner, to a third ECG electrode of the biomedical device, and
the second end being coupled, in a releasable manner and through shape coupling or magnetically, to the first rigid portion or to the second rigid portion,
wherein, in a case where the first rigid portion or the second rigid portion is coupled to the third ECG electrode through the connection assembly, the control circuitry is electrically coupled to the third ECG electrode and is configured to acquire, through the third ECG electrode, a further electrical signal indicative of the one or more physiological parameters.

13. A biomedical device, comprising:
a solid body wearable by a patient, the solid body including:
 a first rigid portion including a coupling portion and one or more pogo pin elements, the pin elements extending from the coupling portion;
 a removable lid including a thread configured to couple with the coupling portion and one or more respective coupling openings configured to receive the one or more pogo pin elements;
 a second rigid portion;
 a connection portion of a flexible type that couples the first and the second rigid portions to each other; and
 control circuitry in the first rigid portion or the second rigid portion;
a first electrocardiogram (ECG) electrode; and
a second ECG electrode,
wherein the connection portion is interposed between the first and the second rigid portions, is integral with the first and the second rigid portions, and is deformable to allow a relative movement of the first and the second rigid portions,
wherein the first rigid portion is physically coupled, in a releasable manner, to the first ECG electrode, and the second rigid portion is physically coupled, in a releasable manner, to the second ECG electrode, the solid body being couplable to a torso of the patient through the first and the second ECG electrodes, and
wherein, in case where the first and the second rigid portions are coupled to the first and the second ECG electrodes, respectively, the control circuitry is electrically coupled to the first and the second ECG electrodes and is configured to acquire, through the first and the second ECG electrodes, respective electrical signals indicative of one or more physiological parameters.

14. The biomedical device according to claim 13, wherein each of the first ECG electrode and the second ECG electrode includes:
a sensitive element of conductive material, including an ECG protrusion coupled, in a releasable manner, to the first rigid portion or to the second rigid portion; and
a patch attached to the sensitive element, and configured to couple the sensitive element to the torso of the patient.

15. The biomedical device according to claim 13, further comprising:
a third ECG electrode,
wherein the solid body includes a connection assembly of flexible and filiform type, having a first end and a second end opposite to each other,
wherein the first end is coupled, through shape coupling and in a releasable manner, to the third ECG electrode,
wherein the second end is coupled, in a releasable manner and through shape coupling or magnetically, to the first rigid portion or to the second rigid portion,
wherein, in a case where the first rigid portion or the second rigid portion is coupled to the third ECG electrode through the connection assembly, the control circuitry is electrically coupled to the third ECG electrode and is configured to acquire, through the third ECG electrode, a further electrical signal indicative of the one or more physiological parameters.

16. A device, comprising:
a first rigid portion having:
a first side;
a second side; and
a coupling portion on the first side and having one or more pogo pin elements;
an opening in the first side of the first rigid portion, the opening configured to receive a battery;
a lid configured to couple with the coupling portion so that the opening is between the lid and the coupling portion, the lid having one or more respective cavities configured to receive the one or more pogo pin elements;
a first electrocardiogram (ECG) seat on the second side of the first rigid portion, the first ECG seat configured to couple to a first ECG;
a second rigid portion having a first side and a second side;
a user interface element on the first side of the second rigid portion;
a second ECG seat on the second side of the second rigid portion, the second ECG seat configured to couple to a second ECG; and
a flexible portion coupled between the first rigid portion and the second rigid portion, the flexible portion configured to adjust an angle between the first side of the first rigid portion and the first side of the second rigid portion.

17. The device of claim 16, further comprising:
an ECG electrical connection on the first rigid portion or the second rigid portion, the ECG electrical connection configured to couple to a third ECG.

18. The device of claim 17, wherein the ECG electrical connection is coupled to the third ECG by a flexible connection assembly.

19. The device of claim 16, wherein a shape of the first rigid portion tapers towards the flexible portion, and a shape of the second rigid portion tapers towards the flexible portion.

20. The device of claim 16, further comprising:
a lid portion configured to cover the opening; and
a release element configured to release the lid portion from the first rigid portion.

* * * * *